Patented Sept. 25, 1945

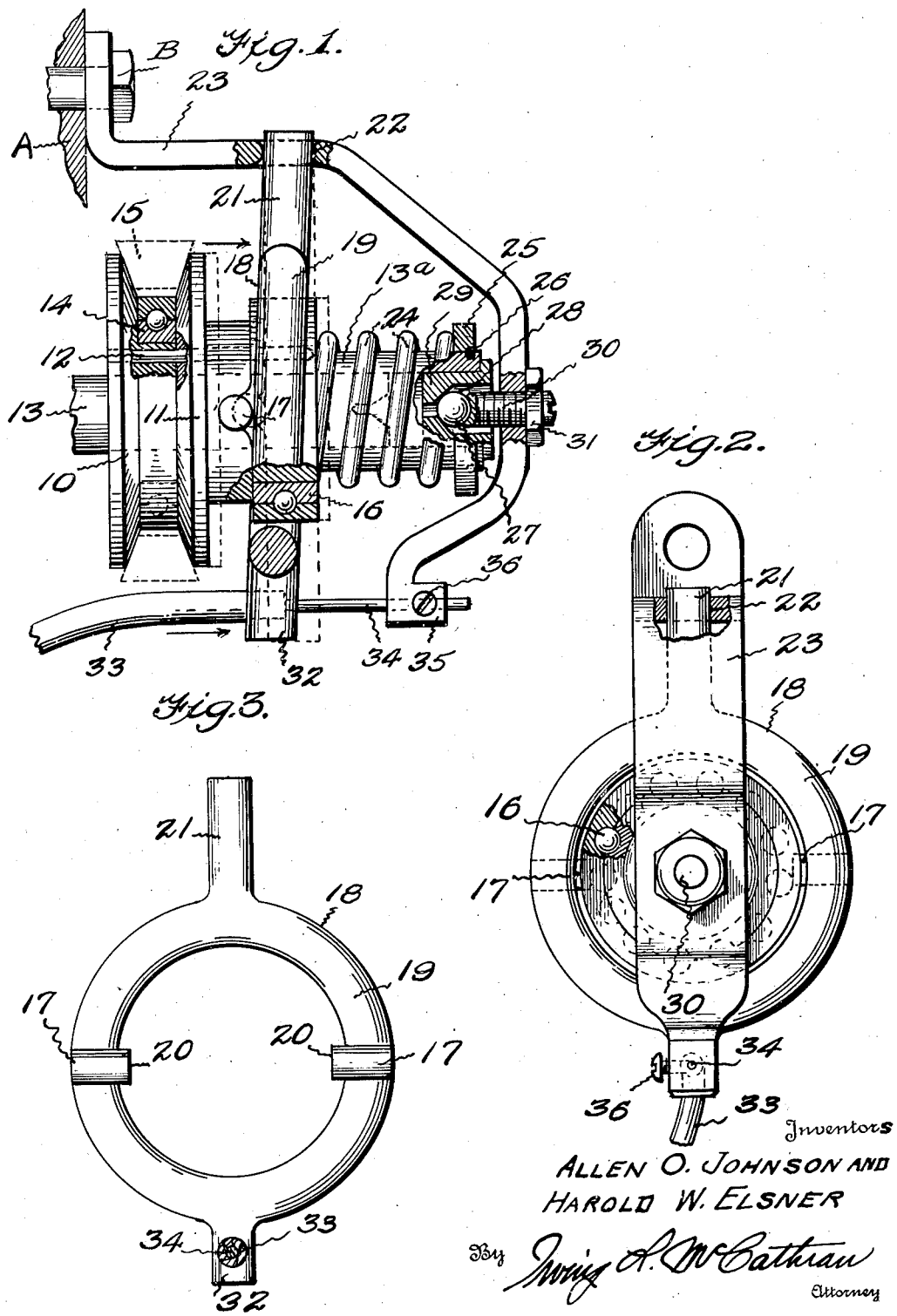

2,385,360

UNITED STATES PATENT OFFICE 2,385,360

V-BELT CLUTCH ASSEMBLY

Allen O. Johnson and Harold W. Elsner,
Burbank, Calif.

Application November 12, 1943, Serial No. 510,026

5 Claims. (Cl. 74—230.17)

This invention relates to a friction-free V-belt clutch assembly, and has for one of its objects the production of a simple and efficient clutch having a thrust bearing arrangement which is so constructed as to compress the spring of the clutch without throwing the thrust load upon the driving motor or driving mechanism.

Another object of this invention is the production of a simple and efficient V-belt clutch which is so constructed as to provide for complete disengagement and to reduce the friction between the pulley and the belt to a minimum.

Other objects and advantages of the present invention will appear throughout the following specification and claims.

In the drawing:

Figure 1 is a side elevational view of the clutch mechanism, with certain parts being shown in section;

Figure 2 is an end elevational view thereof, with certain parts being shown in section;

Figure 3 is a side view of the control arm of the clutch.

By referring to the drawing, it will be seen that 10 designates the fixed half of the pulley. The movable half 11 of the pulley is keyed to the fixed half 10 by means of a small hardened round pin 12 shown in Figure 1. This structure permits movable half 11 of the pulley to slide lengthwise of the sleeve 13ᵃ. A sealed ball-bearing 14 is carried by the fixed half 10 of the pulley, and is so arranged as to permit the V-belt 15 shown in dotted lines in Figure 1, to drop down and rest thereon when the movable half 11 of the pulley is moved away from the belt 15. A thrust bearing 16 is carried by the movable half 11 of the pulley, and this thrust bearing 16 is engaged by the inwardly-extending lugs or pins 17 of the control arm 18. The arm 18 is provided with a ring or circular body 19 which surrounds the bearing 16. These pins 17 are carried by one side of the ring 19 and are arranged diametrically opposite each other. The pins are provided with inner ends 20 which project inwardly toward the center of the ring 19 so as to overlap the adjoining edge of the thrust bearing 16, as shown in Figure 2. This control arm 18 is provided with a projecting anchoring finger 21 which extends at right angles to the pins 17 and is anchored in the aperture 22 formed in the support or hanger 23. This finger 21, by fitting in the aperture 22 provides a fulcrum for the control arm 18. The hanger 23 is anchored to the support, such as a motor A by means of a suitable securing means or bolt B, as shown.

A coil spring 24 engages one side of the thrust bearing 16 and the opposite end of this spring 24 engages the spring retainer 25. This retainer 25 is held in place by an expansion retaining wire ring 26 of a conventional type. This retainer 25 is in the nature of a washer having a step turned on the inside diameter to clear the wire ring 26 which in turn fits in a groove turned in the end of the sleeve 13ᵃ which forms an integral part with the fixed half 10 of the pulley.

The hanger 23 is supported in addition to the anchoring bolt B, by means of a single ball thrust bearing 27 which rests in the socket 28 formed in the bearing support 29. This support 29 fits in the end of the sleeve 13ᵃ, as shown in Figure 1. A set screw 30 is threaded into the hanger 23 and rests upon or against the ball bearing 27, thereby providing a bearing between the hanger 23 and the sleeve 13ᵃ, and fixed half 10 of the pulley which is carried by the shaft 13. The set screw 30 is locked in place by means of a lock nut 31 to prevent the set screw 30 from turning.

The control arm 18 is provided with a depending apertured finger 32 which receives one end of a remotely controlled flexible tube 33 and cable 34 to facilitate the operation of the control arm 18 in relation to the hanger 23. The end of the cable 34 is anchored to the end 35 of the hanger and is locked therein by a set screw 36.

It should be understood that the present device provides a clutch which is designed to disengage 100%. When the movable half 11 of the pulley is moved in the direction of the arm shown in Figure 1 to the dotted position away from the fixed half 10 of the pulley, this movement separates the two halves of the pulley, thereby allowing the belt 15 shown in dotted lines, to rest on the ball bearing race 14, thereby bringing the friction between the belt and the pulley to a minimum. This allows the motor or driving mechanism to run freely without loss of power.

It should be further understood that the present device provides a thrust bearing arrangement which will compensate the spring 24 without throwing the thrust load upon the motor or driving mechanism. This is accomplished by engaging the thrust bearings 16 and 27 through the medium of the control arm 21 and applying pressure in both directions by means of a flexible tube or cable 33. The pressure thus applied does not throw a load upon the bearings of the driving mechanism or motor.

Certain detail changes in the mechanical construction and arrangement of parts may be employed without departing from the spirit of the invention, so long as such changes fall within the scope of the appended claims.

Having described the invention, what is claimed is:

1. A V-belt clutch of the class described comprising a pulley having a fixed section and a movable section, said fixed section having a sleeve projecting through the movable section, a spring carried by the sleeve, a bearing carried by the movable section and engaged by said spring for holding the movable section in contact with the fixed section, a hanger adapted to be secured to a support, a control arm fulcrumed on said hanger, a ring carried by the control arm and surrounding said bearing, inwardly extending pins carried by the ring and contacting said bearing for moving said movable section to a disengaging position relative to the fixed section, and means for swinging said control arm to move said movable section to a disengaging position.

2. A V-belt clutch of the class described comprising a pulley having a fixed section and a movable section, said fixed section having a sleeve projecting through the movable section, a spring carried by the sleeve, a bearing carried by the movable section and engaged by said spring for holding the movable section in contact with the fixed section, a hanger adapted to be secured to a support, a control arm fulcrumed on said hanger, a ring carried by the control arm and contacting said bearing for moving said movable section to a disengaging position relative to the fixed section, a depending finger carried by the control arm, a remotely controlled flexible tube and cable connected to said finger for swinging said control arm, and means for anchoring one end of said cable to said hanger.

3. A V-belt clutch of the class described comprising a pulley having a fixed section and a movable section, said fixed section having a sleeve projecting through the movable section, a spring carried by the sleeve, a bearing carried by the movable section and engaged by said spring for holding the movable section in contact with the fixed section, a hanger adapted to be secured to a support, a control arm fulcrumed on said hanger, a ring carried by the control arm and contacting said bearing for moving said movable section to a disengaging position relative to the fixed section, means for swinging said control arm to move said movable section to a disengaging position, a single ball thrust bearing carried by the end of the sleeve, and an adjustable set screw carried by the hanger and engaging the single ball thrust bearing.

4. A clutch of the class described comprising a pulley having a fixed section and a movable section, a sleeve carried by one section and projecting through the other section, yieldable means carried by the sleeve, a bearing carried by one section and engaged by said yieldable means for holding said sections in contacting relation, a control arm, a fulcrum support engaging one end of said control arm, means carried by the control arm for contacting said bearing and for moving said movable section to a disengaging position relative to the fixed section, and actuating means engaging the opposite end of said control arm for swinging said control arm.

5. A clutch of the class described comprising a pulley having a fixed section and a movable section, a sleeve carried by one section and projecting through the other section, yieldable means carried by the sleeve, a bearing carried by one section and engaged by said yieldable means for holding said sections in contacting relation, a control arm, a fulcrum support engaging one end of said control arm, means carried by the control arm for contacting said bearing and for moving said movable section to a disengaging position relative to the fixed section, actuating means engaging the opposite end of said control arm for swinging said control arm, and an adjustable bearing engaging the end of said movable section and located intermediate said fulcrum support and said actuating means for the control arm.

ALLEN O. JOHNSON.
HAROLD W. ELSNER.